(12) United States Patent
Andriopoulou

(10) Patent No.: US 11,800,013 B2
(45) Date of Patent: Oct. 24, 2023

(54) METHOD AND SYSTEM FOR DYNAMIC SHORT DIAL ALLOCATION IN EMERGENCY SYSTEMS

(71) Applicant: Unify Patente GmbH & Co. KG, Munich (DE)

(72) Inventor: Foteini Andriopoulou, Patras (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/825,530

(22) Filed: May 26, 2022

(65) Prior Publication Data

US 2022/0394129 A1 Dec. 8, 2022

(30) Foreign Application Priority Data

Jun. 8, 2021 (EP) .................................... 21178335

(51) Int. Cl.
*H04M 3/51* (2006.01)
*H04M 3/42* (2006.01)
*H04M 3/44* (2006.01)

(52) U.S. Cl.
CPC ..... *H04M 3/5116* (2013.01); *H04M 3/42357* (2013.01); *H04M 3/44* (2013.01)

(58) Field of Classification Search
None
See application file for complete search history.

(56) References Cited

U.S. PATENT DOCUMENTS

| | | | |
|---|---|---|---|
| 9,014,657 B2 | 4/2015 | Rohde et al. | |
| 9,118,981 B2 | 8/2015 | Hughes et al. | |
| 9,491,604 B2 | 11/2016 | Michael | |
| 10,343,062 B2 | 7/2019 | Abernethy, Jr. et al. | |
| 2002/0068599 A1* | 6/2002 | Rodriguez | H04M 1/2757 455/564 |
| 2011/0176481 A1* | 7/2011 | Purnadi | H04W 76/50 370/328 |
| 2020/0314240 A1* | 10/2020 | Leavitt | G16H 80/00 |
| 2022/0295252 A1* | 9/2022 | Malone | H04W 4/021 |

OTHER PUBLICATIONS

European Search Report for EP21178335.2 dated Nov. 5, 2021.

\* cited by examiner

*Primary Examiner* — Hemant S Patel
(74) *Attorney, Agent, or Firm* — Buchanan Ingersoll & Rooney PC

(57) ABSTRACT

A method, system, and computer program product for dynamic short dial allocation in emergency systems can be configured for acquisitioning, by a PSAP element, data from a caller, smart device and/or sensor processing and storing the data. Further, identifying, by a decision framework located at the PSAP side an emergency incident by means of the data and extracting, by the decision framework an appropriate emergency pattern for the identified emergency incident. Furthermore, gathering geolocation information from the caller, smart device and/or sensor and retrieving emergency services or departments at the geolocation area of the caller, smart device and/or sensor. Subsequently, providing appropriate emergency services or departments which must be notified according to the emergency incident to the call taker and displaying appropriate short dials for the emergency services or departments which must be notified.

19 Claims, 2 Drawing Sheets

METHOD AND SYSTEM FOR DYNAMIC SHORT DIAL ALLOCATION IN EMERGENCY SYSTEMS

CROSS-REFERENCE TO RELATED APPLICATIONS

The present application claims priority to European Patent Application No. EP 21 178 335.2 filed on Jun. 8, 2021. The entirety of this European Patent Application is incorporated by reference herein.

FIELD

The present invention relates to a method, system and a computer program product for dynamic short dial allocation in emergency systems.

BACKGROUND

COVID-19 has increased the number of emergency calls that reach the emergency systems and Public Safety Answering Points (PSAPs). To respond efficiently and in an accurate manner remains a major challenge to global public health during emergencies, including epidemics.

Currently, at the emergency systems and Public Safety Answering Points (PSAPs), there is a preconfigured tree-based set of short dials for a number of emergency services. Each time, the call taker has to navigate through this tree-based structure in order to select either the appropriate short dial or direct call the dialing number of the emergency service memorized by heart. This throws a spanner in the works for immediate and accurate emergency service provisioning.

U.S. Pat. No. 9,118,981 discloses the basic usage of quick dial soft buttons in communication devices and mobile applications. The quick dial functionality is based on pre-stored dialling numbers that correspond to phonebook addresses and dialing numbers. By pressing the quick dial button, a method is triggered that enables the communication among two or more parties without the user's manual intervention by typing the dialling number.

U.S. Pat. No. 10,343,062 presents a method for changing the contents of the first shortcut button contained in the user interface of an electronic device into the content of a second shortcut button.

U.S. Pat. No. 9,014,657 discloses a speed dial method at the end user side, an emergency button on mobile applications, that enables the user to dial the appropriate PSAP in emergency incidents based on his/her geographical location is disclosed.

U.S. Pat. No. 9,491,604 presents a method and a system for speed-dialing an emergency phone call, from a mobile communication device to an enterprise, based on the enterprise's location data and a selected enterprise emergency-response service. Enterprise location data can be based on a prior interaction between a token, uniquely associated with the mobile communication device, and an enterprise electronic location system.

U.S. Patent Application Publication No. 2002/0068599 presents a system and method for providing a local telephone directory based on a mobile telephone location. In this case, the dynamic speed dial keys may also be assigned so that, for example, the local police station is always assigned to the same speed dial key even though the local police station phone number changes as the mobile phone moves from one area to another. The filtering of data can be performed at either the mobile telephone company or on the mobile telephone after receiving the local directory information.

SUMMARY

The solutions to dynamic short dial allocation are described in the state of the art on the side of the caller and not on the side of the Public Safety Answering Point. However, the requirements of an end-device or end-user during an emergency call are fundamentally different from the requirements of the PSAP agent to provide fast and adequate support.

Therefore, embodiments of the present invention can be based on the object to provide a method, a corresponding system and a corresponding computer program product for dynamic short dial allocation in emergency systems which support primarily the PSAP call taker. Thus, embodiments of the method and system can be mainly intended to be implemented at the PSAP side in order to support the call takers respectively PSAP agent. In addition, method, system and computer program product can also take into account the policy rules that are applied at the emergency system, the caller's geographical location and the data gathered from the smart devices (Internet of Things, IoT) that triggered the PSAP.

Embodiments of a method for dynamic short dial allocation in emergency systems is provided that can include the steps of acquisitioning, by a PSAP element, data from an emergency event, processing, by the PSAP element, the data, storing, by the PSAP element, the data into a data storage database, identifying, by a decision framework located at the PSAP side an emergency incident by means of the data, extracting, by the decision framework located at the PSAP side an appropriate emergency service for the identified emergency incident, gathering, by the PSAP element geolocation information from the caller, smart device and/or sensor, retrieving, by the PSAP element emergency services or departments at the geolocation area of the caller, smart device and/or sensor, providing, by the PSAP element an appropriate emergency services or department which must be notified according to the emergency incident to the call taker, and displaying appropriate short dials for the emergency services or departments which must be notified, to a graphic user interface (GUI) of a PSAP device of the call taker.

A dynamic allocation of a set of short dials at the PSAP side can be proposed instead of providing a tree-based preconfigured structure of numerous short dials that correspond to the appropriate emergency services. Therefore, the time spent for the navigation and selection of the appropriate services can be eliminated.

For the purposes of the invention, data from an emergency event can include any data that can be transmitted to the emergency network. This data includes both emergency call data from a caller and also anything that can be transmitted electronically by a sensor or detector such as IoT (Internet of Things) devices or smart devices (e.g. geolocation data and any data from IoT devices (e.g. sensors, smart devices, etc)). The IoT devices can trigger elements of the emergency network when something related to an emergency has been identified (a camera detects an injured person), or max-min thresholds have been exceeded. Thus, data mainly related to the measurements that are sent form various devices or persons.

For the purposes of the invention, a PSAP element can include any component that can be a physical or virtual part of a PSAP i. e. there may be components such as software that are not physically associated with the PSAP but only interact with it virtually. For example, a first component which is responsible for gathering the data and a second one for processing and evaluating the already aggregated data. There are two distinct processes and components here. However, it is also conceivable that both processes are carried out by a single component or that other components play a role in these processes.

In some embodiments, a PSAP can be a communication device that includes hardware, which can include a processor connected to a non-transitory computer readable medium and at least one transceiver. The computer readable medium can be a non-transitory memory, for example. Each PSAP can include at least one input device and at least one output device, such as, for example, a display, a touch screen display, a pointer device, a mouse, a microphone, a speaker, a stylus, a keyboard, and/or a camera. Code can be stored on the memory that can define at least one method that can be performed by the PSAP when the processor runs the code. The code can include code of at least one application, for example.

Each emergency event can be represented by different indications. A decision framework may use training algorithms and predictive models to determine a set of learning models. Each training algorithm can be fed with preprocessed data of available variables e.g. sensor's outputs, image captures, geolocation data, other IoT devices in the area, etc. and predefined threshold values. As a consequence, the output of this regression process is a set of decision models that can be used to estimate the datasets into weighted relationships which can be led to the identification of the type and the severity of the emergency event. Such a decision framework can for example be part of the PSAP element as embedded software. However, it is also conceivable that such a software is to be implemented as a separate standalone software application that interacts with the PSAP applications. However, it is preferred that such a software is to be integrated at the PSAP application.

According to a preferred embodiment, the method further comprising retrieving policy rules. The policy rules referred are related to the emergency calls. For example, when an emergency call reaches an Emergency Services Routing Proxy (ESRP), it makes a policy-based routing decision based on the location of the calling party after evaluating the origination policy ruleset and additional information. Here, when referring to a retargeted call from other PSAP not only the short dials related to the caller's locations are provided to the PSAP agent but also the appropriate short dials for the nearby locations. This is due to the fact that the PSAP agent must first contact the services at user's location and if there are not available, the services from the nearby location.

In some embodiments, the ESRP can be a communication device that includes hardware, which can include a processor connected to a non-transitory computer readable medium and at least one transceiver. The computer readable medium can be a non-transitory memory, for example. Each ESRP can include at least one input device and at least one output device, such as, for example, a display, a touch screen display, a pointer device, a mouse, a microphone, a speaker, a stylus, a keyboard, and/or a camera. Code can be stored on the memory that can define at least one method that can be performed by the ESRP when the processor runs the code. The code can include code of at least one application, for example. Examples of an ESRP can include one or more servers configured to function as an ESRP, for example.

According to another preferred embodiment, the method in the step of identifying the emergency incident further comprising using an emergency pattern database.

According to still another preferred embodiment, the method in the step of extracting the appropriate emergency service further comprising using an emergency scenario database.

Further, according to a preferred embodiment, the method decreases the time complexity of navigating, searching and selecting the appropriate short dials button through a short dials menu of tree_depth O(n) to tree_depth O(1) due to a simplification of function (1) to function (2). When more than one emergency services (m) have to be notified the time complexity is further reduced from tree_depth $(O(n))*(m)+(m-1)$ to m.

$$\text{tree\_depth}(O(n))*(m)+(m-1) \quad \text{(function 1)},$$

$$\text{tree\_depth}(O(1))*(m)=1*(m)=m \quad \text{(function 2)}.$$

According to another preferred embodiment, the method further comprising a step of extending an existing protocol for transferring media data with a new field in the case the method is used in at least one of Public Safety solutions, Next Generation 9-1-1 (NG911), Next Generation 112 (NG112) or OpenScape First Response and Global Emergency Management (GEMMA).

According to still another preferred embodiment, the existing protocols for transferring media data is at least one of Session Description Protocol (SDP) or computer-supported telecommunications applications (CSTA).

Further, according to a preferred embodiment, wherein the new field is one of automaticCall or directDeviceID. For example, CSTA callCharacteristics element could be extended with the aforementioned fields automaticCall and directDeviceID.

According to yet another preferred embodiment, the automaticCall field will be set to true when the call is initiated automatically by at least one of third-party service, network connecting device or Internet of Things (IoT).

According to yet another preferred embodiment, wherein the third-party service, network connecting devices or Internet of Things (IoT) is at least one of sound detector, smoke detector, gas detector, camera, smart phone, smart sensor, Session Initiation Protocol (SIP) phone, mobile device, wearable sensor or smart watch. Network connected devices (e.g. smart sensors, SIP phones, mobile devices, wearable sensors) are able to detect a variety of events such as sounds, speech, smoke, etc. and are able to generate automatic triggering mechanisms to the emergency systems and PSAPs.

According to still another preferred embodiment, the method in the step of providing appropriate emergency services or department which must be notified according to the emergency incident to the call taker, further comprising using a database with pre-stored short dials. This database can be queried to select certain pre-stored short dials for a certain geolocation and a certain emergency scenario.

According to yet another preferred embodiment, in case that no information for the appropriate emergency services could be provided, then only the short dial buttons that are correlated to the caller's geographical zone are displayed in the GUI.

A corresponding system for dynamic short dial allocation in emergency systems is provided. Wherein the system can be configured to perform an embodiment of the method for dynamic short dial allocation in emergency systems. The system can include at least one PSAP element configured to acquire, to process and to store data from an emergency event, wherein the PSAP element is further configured to gather geolocation information from the emergency event; and to retrieve emergency services at the geolocation area of the event; and wherein the PSAP element is configured to provide appropriate emergency services which must be notified according to the emergency incident to a call taker at the PSAP side; and to display appropriate short dials for the emergency services which must be notified, to a graphic user interface (GUI) of a PSAP call handling application or PSAP application of the call taker.

As mentioned above, embodiments of the PSAP element can include any component that can be a physical or virtual part of a PSAP i. e. there may be components such as software that are not physically associated with the PSAP but only interact with it virtually. For example, a first component which is responsible for gathering the data and a second one for processing and evaluating the already aggregated data. There can be two distinct processes and components here. However, it is also conceivable that both processes are carried out by a single component or that other components play a role in these processes. A PSAP element can also include a communication device configured to function as a PSAP as noted above.

The system further comprises a decision framework located at the PSAP side configured to identify an emergency incident by means of the data; and to extract an appropriate emergency service for the identified emergency incident.

A decision framework may use training algorithms and predictive models to determine a set of learning models. Each training algorithm can be fed with preprocessed data of available variables e.g. sensor's outputs, image captures, geolocation data, other IoT devices in the area, etc. and predefined threshold values. As a consequence, the output of this regression process is a set of decision models that can be used to estimate the datasets into weighted relationships which can be led to the identification of the type and the severity of the emergency event. Such a decision framework can for example be part of the PSAP element as embedded software. However, it is also conceivable that such a software is to be implemented as a separate standalone software application that interacts with the PSAP applications. However, it is preferred that such a software is to be integrated at the PSAP application.

Embodiments of the system can also include a data storage database and a PSAP call handling application or a PSAP software application with a GUI.

According to a preferred embodiment, the system further comprising an emergency pattern database and/or an emergency scenario database.

According to still another preferred embodiment, the system further comprising a database with pre-stored short dials. Wherein the system is configured to query this database to select certain pre-stored short dials for a certain geolocation and a certain emergency scenario.

Embodiments of the system can also include other devices. For instance, embodiments can include at least one ESRP.

A non-transitory computer readable medium is also provided. The medium can include a computer program product comprising machine-readable instructions stored a non-transitory storage medium (e.g non-transitory memory), wherein the computer program product is configured so that a device that runs the machine-readable instructions perform an embodiment of the method for dynamic short dial allocation in emergency systems.

Embodiments of a method, a corresponding system and a corresponding non-transitory computer readable medium are provided that can facilitate the dynamic allocation of short dial buttons that correspond to the appropriate emergency services based on the triggering event and the geographical location. This can lead to the reduction of the required time from the call takers side to evaluate the severity of the event and select the appropriate short dial from a pool of short dials. Embodiments can support evaluating an emergency incident and provide dynamically the appropriate short dial(s) in order to notify and coordinate the first responders. Moreover, the appropriate short dial buttons related to the extracted services from the proposed mechanism can be provided. In order to select the appropriate short dials, policy rules may be applied at the PSAP side, the caller's geographical location and the data gathered from the smart devices, that triggered the PSAP through the enhanced message protocol exchange, are considered. These emergency services can be notified and coordinated in order to support the caller. This offers the advantage of eliminating the time response to the emergency incident.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawing. It should be appreciated that like reference numbers can identify similar components.

DETAILED DESCRIPTION

Figure 1:
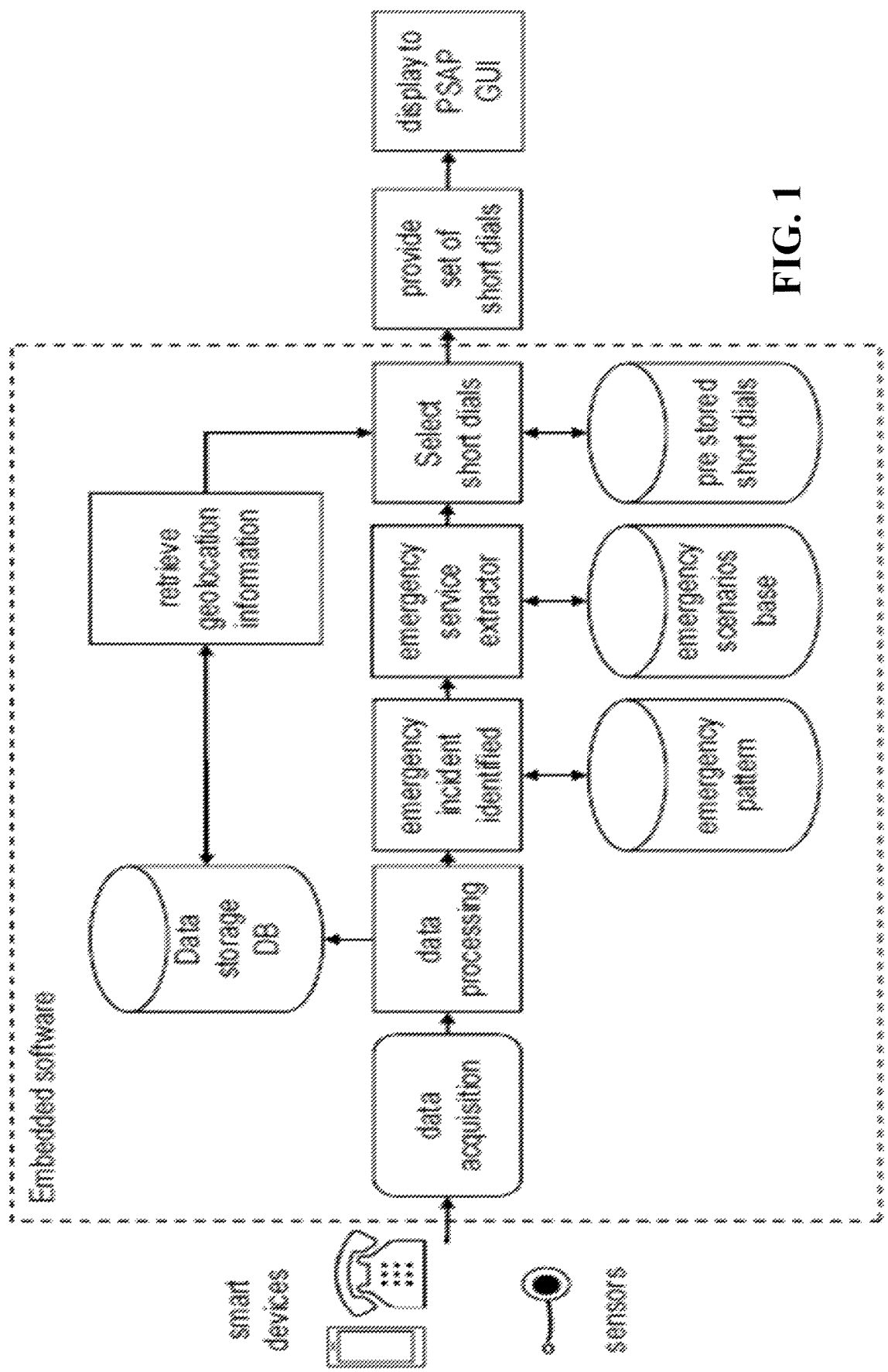
FIG. 1 shows a schematic illustration of components and steps according to a system and/or method of an embodiment of the invention.

FIG. 1 schematically shows an illustration of components and steps according to a system and/or method of an embodiment of the invention. Data from an emergency call is transferred from devices or other sensors of the caller to the emergency call center or a PSAP. In addition, further data can be transferred from other devices or sensors located in the proximity or in the sphere of the caller for example from IoT (Internet of things) devices. The data is processed and stored in a dedicated database which also stores the geolocation information of the calling or calling device or sensor, if available. The data is then compared with an emergency pattern database to see whether it is a "standardized" emergency. If this is the case, the emergency services or emergency departments that match the identified emergency scenario are selected from an emergency scenario database using an emergency service extractor. Using the caller's geolocation information or that of devices/sensors, only the emergency services/departments located in that geolocation area will be provided. These emergency services/departments should then be made available using short-dial buttons. For this purpose, another database with pre-stored short dials can be queried which selects certain pre-stored short dials for a certain geolocation and a certain emergency scenario. Subsequently, the available and necessary short dials are displayed, for example, on the GUI of the PSAP. However, it is also possible to include certain emergency policy rules in the process. For this purpose, a further database with policy rules is queried to determine whether certain rules must be taken into account for a specific emergency scenario and whether other emergency services or departments should also be displayed or be displayed instead.

Figure 2:
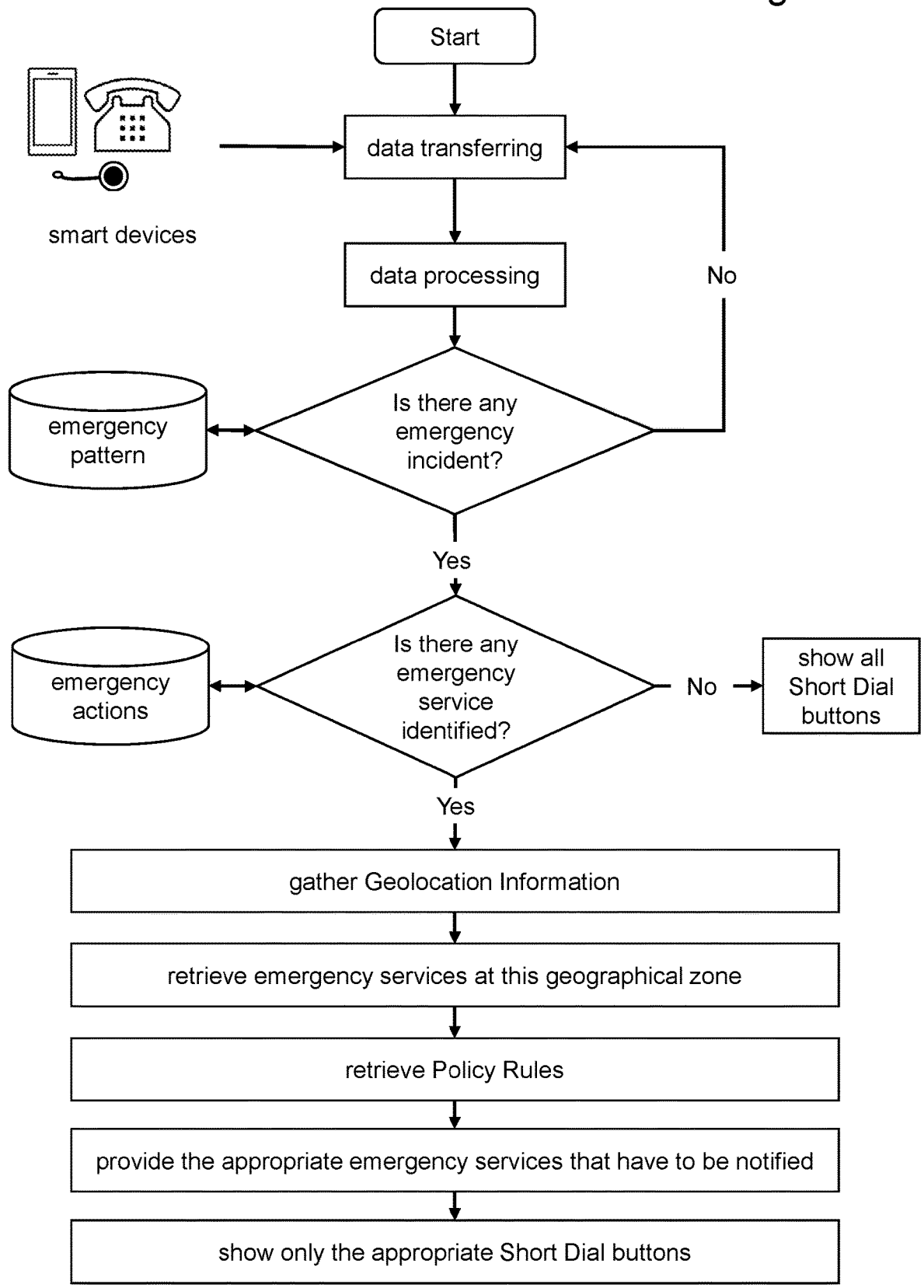
FIG. 2 shows a flowchart of the method for dynamic short dial allocation in emergency systems according to another embodiment of the invention.

FIG. 2 shows a flowchart of the method for dynamic short dial allocation in emergency systems. If an emergency call is received by an emergency call center (PSAP), the data of the emergency call is transferred to the emergency call center (PSAP). In addition, other available data from the caller's device as well as from other devices or sensors in its vicinity can be collected and transmitted. In a subsequent step, the data is processed, and it is first determined whether an emergency incident already exists for this data. This is done with the help of a database that contains different emergency patterns. If an emergency incident matches the existing patters already stored at the emergency patterns database, it is then determined whether one or more emergency services or emergency departments must be alerted if this emergency incident occurs. This is done with the help of another database which contains different emergency scenarios. If there is no such emergency scenario, the PSAP agent or call taker is shown all available short-dial buttons. If, on the other hand, an emergency scenario can be identified, an attempt is made to use the geolocation information of the caller or the devices or sensors in his or her immediate proximity in order to obtain the appropriate and available emergency services or emergency departments. Subsequently, this geolocation information can be compared and differentiated with the standard policy rules. This means, for example, which emergency service must be notified in addition or instead of another in any case. Subsequently, only those necessary emergency services or emergency departments are made available and displayed to the PSAP agent or the call taker by means of an appropriate short-dial button, which are available for the emergency at hand and must be alerted according to the local or other regulations.

In the following, an example is described of how the method according to an embodiment of the invention reduces the complexity and the time required to adequately respond to an emergency call compared to the currently used method. Currently, an administrator of an emergency system configures a set of short dials to de displayed to all the call takers that belong to the same organization or in other words to all PSAP agents or personnel that receives the emergency calls. Most of the times these buttons correspond to general organization categories (i.e. hospital, police, coast guard, etc.). Each one of these buttons has children buttons meaning a different button for each above-mentioned subcategory (i.e. COVID-19 hospitals, general hospitals, etc). These subcategory buttons may have further subcategories based on the size of the province for which the emergency center is responsible. Usually, there is not any central entity that routes the calls to the service. Currently, the PSAP agent that handles the call, upon the identification of the emergency event and the required services, he/she navigates to the tree-based pre-configured short dial menu in order to select the appropriate services. Based on the depth of the tree, the time complexity for navigating to the short dial menu is $O(n)$. Even for a small province the depth of the tree can be at least two or three ($O(2)$ or $O(3)$). A common example is the police station button and subcategories based on smaller departments per each area. This simple paradigm has an $O(2)$ complexity and time consuming. In case of medium and large states this number can be increased rapidly to $O(n)$ complexity and time consuming where (n) are the sub-provinces of the state. Assuming a small to medium sized city emergency center has a depth of the tree of $O(2)$. This means that there are categories for each emergency department (i.e. hospital, police, coast guard, etc.) and each of these categories are divided to subcategory of the local department. Now imagine the following scenario, a gas explosion occurs in an industrial area of the city's sub-domain. Citizens call the emergency center in order to report the issue and ask for help. Call taker of city's emergency center has to select the short dial of fire department button ($1^{st}$ step) and then select the appropriate fire department of the sub-domain ($2^{nd}$ step). In order to contact the police on this area, the call taker/PSAP agent has to navigate to the main menu of short dials (1 click back-$3^{rd}$ step) and select police button ($4^{th}$ step) and then select the police department of the sub-domain ($5^{th}$ step) in order to contact the police department on this area. In case that more departments (m) are involved as, for example the hospital for victims, the complexity and time consuming to coordinate the first responders is increased and is equal to $$\text{tree\_depth}(O(n))*(m)+(m-1)$$

$$2*2+(2-1)=5 \qquad \text{(function 1)}$$

In this example, the gas IoT device triggers our mechanism located at the emergency center and provides its geolocation data and the gas level concentration. The mechanism retrieves the geolocation data of the emergency triggering mechanism and/or the emergency type of the device and displays only the appropriate buttons by means of the fire and police departments of the appropriate local area. Call taker has to select the short dial for the fire department ($1^{st}$ step) and then the short dial for the police department ($2^{nd}$ step) in order to coordinate them. For coordinating m departments, the complexity and time consuming, function (1) is simplified to function 2:

$$\text{tree\_depth}(O(1))*(m)=1*(m)=m$$

$$1*2=2. \qquad \text{(function 2)}$$

Since there aren't back and forth steps to navigate to the main menu and tree_depth equals always to $O(1)$. Moreover, in case of extreme emergency cases such as earthquake, gas explosion, etc., the emergency centers of a province usually get overwhelmed and the emergency routing is directed to other emergency centers. This means that the tree depth is greater than 2 or the call taker may not have at all the appropriate short dial buttons to transfer emergency calls direct to the appropriate first responders. The proposed mechanism can bypass this using geolocation information and identifying triggering event from IoT devices leading to decreased response time.

In the following, a further case study is described in which the method according to an embodiment of the invention can be used. Let us assume that person A's home is equipped with IoT devices sound detectors, cameras and person A is wearing a smart device, smart watch, that detects heart beats. Now person A is attacked by person B. The smart devices, camera and sound detector detect person A screaming and the smartwatch of person A detects an abnormal heartbeat. These smart devices send to the PSAP the data. At the PSAP side, the data is gathered from the same device (home gateway) that reach the PSAP. This data is processed and evaluated finally an emergency scenario is identified which suggests that the ambulance and the police emergency service should be notified. The geographical data and the applied policy rules for this time frame and the network traffic at the ambulance and police service in this geographical zone are considered. Based on this piece of information, at the call taker side, a set of two short dial buttons are provided that corresponds to the ambulance and police service at person A's geographical zone. This can eliminate the response to the emergency incident.

Embodiments can contribute to a dynamic allocation method of short dials based on the geographical data and the type of emergency received from the triggering devices.

It should be appreciated that different embodiments of the method, communication system, communication apparatus, PSAP, and ESRP can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for dynamic short dial allocation in emergency systems, comprising:
    acquisitioning, by a Public Safety Answering Point (PSAP) element, data from an emergency event;
    processing, by the PSAP element, the data;
    storing, by the PSAP element the data into a data storage database;
    identifying, by a decision framework located at the PSAP side an emergency incident by means of the data;
    extracting, by the decision framework an appropriate emergency service for the identified emergency incident;
    gathering, by the PSAP element, geolocation information from the emergency event;
    retrieving, by the PSAP element, emergency services at the geolocation area of the emergency event;
    providing, by the PSAP element, appropriate emergency services which must be notified according to the emergency incident to a call taker at the PSAP side, the providing of the appropriate emergency services which must be notified comprising querying a database having pre-sorted short dials for a certain geolocation and a certain emergency scenario, based on the identified emergency incident and the geolocation area of the emergency event, to identify appropriate short dials for the appropriate emergency services at the geolocation area of the emergency event; and
    displaying, by the PSAP element, only the appropriate short dials for the emergency services which must be notified, to a graphic user interface (GUI) of a PSAP device of the call taker.

2. The method of claim 1, wherein the method further comprising retrieving, by the PSAP element policy rules.

3. The method of claim 1, wherein the identifying of the emergency incident further comprising using an emergency pattern database.

4. The method of claim 1, wherein the extracting of the appropriate emergency service further comprising using an emergency scenario database.

5. The method of claim 1 wherein the displaying of only appropriate short dials comprises displaying buttons for the short dials on the GUI.

6. The method of claim 1, wherein in the case that more than one emergency services (m) have to be notified the time complexity is reduced for a tree depth (O(n)) from (O(n)* (m)+(m)−1) to (m).

7. The method of claim 1, wherein the method is utilized in conjunction with Next Generation 9-1-1 (NG911), Next Generation 112 (NG112), and/or OpenScape First Response and Global Emergency Management (GEMMA), extending an existing protocol for transferring media data with a new field.

8. The method according to claim 7, wherein the existing protocols for transferring media data is at least one of Session Description Protocol (SDP) or computer supported telecommunications applications (CSTA).

9. The method of claim 8, A method for dynamic short dial allocation in emergency systems, comprising:
    acquisitioning, by a Public Safety Answering Point (PSAP) element, data from an emergency event
    processing, by the PSAP element, the data;
    storing, by the PSAP element, the data into a data storage database;
    identifying, by a decision framework located at the PSAP side an emergency incident by means of the data;
    extracting, by the decision framework an appropriate emergency service for the identified emergency incident;
    gathering, by the PSAP element, geolocation information from the emergency event
    retrieving, by the PSAP element, emergency services at the geolocation area of the emergency event
    providing, by the PSAP element, appropriate emergency services which must be notified according to the emergency incident to a call taker at the PSAP side; and
    displaying, by the PSAP element, appropriate short dials for the emergency services which must be notified, to a graphic user interface (GUI) of a PSAP device of the call taker;
    wherein the method is utilized in conjunction with Next Generation 9-1-1 (NG911), Next Generation 112 (NG112), and/or OpenScape First Response and Global Emergency Management (GEMMA), extending an existing protocol for transferring media data with a new field and the new field is one of automaticCall or directDeviceID; and
    wherein the existing protocols for transferring media data is at least one of Session Description Protocol (SDP) or computer supported telecommunications applications (CSTA).

10. The method of claim 9, wherein the automaticCall will be set to true when the call is initiated automatically by at least one of third-party service, network connecting device or Internet of Things (IoT).

11. The method of claim 10, wherein the third-party service, network connecting devices or Internet of Things (IoT) is at least one of a sound detector, a smoke detector, a gas detector, a camera, a smart phone, a smart watch, smart sensors, telephones, mobile devices, or wearable sensors.

12. A system for dynamic short dial allocation in emergency systems, comprising:
    a Public Safety Answering Point (PSAP) element configured to acquire, to process and to store data from an emergency event, wherein the PSAP element is further configured to gather geolocation information from the emergency event; and to retrieve emergency services at the geolocation area of the event; and wherein the PSAP element is configured to provide appropriate emergency services which must be notified according to the emergency incident to a call taker at the PSAP side via querying a database having pre-sorted short dials for a certain geolocation and a certain emergency scenario, based on the identified emergency incident and the geolocation area of the emergency event, to identify appropriate short dials for the appropriate emergency services at the geolocation area of the emergency event; and to display the appropriate short dials for only the emergency services which must be notified, to a graphic user interface (GUI) of a PSAP device of the call taker;

a decision framework located at the PSAP side configured to identify an emergency incident by means of the data; and to extract the appropriate emergency service(s) for the identified emergency incident;

a data storage database to store the data from the emergency event; and a PSAP call handling application or PSAP application with a GUI.

13. The system of claim 12, wherein the system further comprising an emergency pattern database and/or an emergency scenario database.

14. The system of claim 13, wherein the system further comprising the database having the pre-sorted short dials for the certain geolocation and the certain emergency scenario.

15. The system of claim 12, wherein in the case that more than one emergency services (m) have to be notified the time complexity is reduced for a tree depth (O(n)) from (O(n)*(m)+(m)−1) to (m).

16. The system of claim 12, wherein the system is configured for utilization in conjunction with Next Generation 9-1-1 (NG911), Next Generation 112 (NG112), and/or OpenScape First Response and Global Emergency Management (GEMMA) via extending an existing protocol for transferring media data with a new field and the new field is one of automaticCall or directDeviceID; and wherein the existing protocols for transferring media data is at least one of Session Description Protocol (SDP) or computer supported telecommunications applications (CSTA).

17. A non-transitory computer readable medium having machine-readable instructions stored thereon so that a method is performed when the instructions are run by a communication device configured as a Public Safety Answering Point (PSAP) element, the method comprising:

acquisitioning, by the PSAP element, data from an emergency event;

processing, by the PSAP element, the data;

storing, by the PSAP element the data into a data storage database;

identifying, by a decision framework located at the PSAP side an emergency incident by means of the data;

extracting, by the decision framework an appropriate emergency service for the identified emergency incident;

gathering, by the PSAP element geolocation information from the emergency event;

retrieving, by the PSAP element emergency services at the geolocation area of the emergency event;

providing, by the PSAP element appropriate emergency services which must be notified according to the emergency incident to a call taker at the PSAP side, the providing of the appropriate emergency services which must be notified comprising querying a database having pre-sorted short dials for a certain geolocation and a certain emergency scenario, based on the identified emergency incident and the geolocation area of the emergency event, to identify appropriate short dials for the appropriate emergency services at the geolocation area of the emergency event; and displaying, by the PSAP element, only the appropriate short dials for the emergency services which must be notified, to a graphic user interface (GUI) of a PSAP device of the call taker.

18. The non-transitory computer readable medium of claim 17, wherein the method is utilized in conjunction with Next Generation 9-1-1 (NG911), Next Generation 112 (NG112), and/or OpenScape First Response and Global Emergency Management (GEMMA), extending an existing protocol for transferring media data with a new field and the new field is one of automaticCall or directDeviceID; and wherein the existing protocols for transferring media data is at least one of Session Description Protocol (SDP) or computer supported telecommunications applications (CSTA).

19. The non-transitory computer readable medium of claim 17, wherein in the case that more than one emergency services (m) have to be notified the time complexity is reduced for a tree depth (O(n)) from (O(n)*(m)+(m)−1) to (m).

\* \* \* \* \*

UNITED STATES PATENT AND TRADEMARK OFFICE
CERTIFICATE OF CORRECTION

| | |
|---|---|
| PATENT NO. | : 11,800,013 B2 |
| APPLICATION NO. | : 17/825530 |
| DATED | : October 24, 2023 |
| INVENTOR(S) | : Foteini Andriopoulou |

It is certified that error appears in the above-identified patent and that said Letters Patent is hereby corrected as shown below:

In the Claims

Column 10, Line 21: delete: "The method of claim 8,".

Signed and Sealed this
Second Day of January, 2024

Katherine Kelly Vidal
*Director of the United States Patent and Trademark Office*